United States Patent
Buehrer et al.

(10) Patent No.: US 6,614,857 B1
(45) Date of Patent: Sep. 2, 2003

(54) ITERATIVE CHANNEL ESTIMATION AND COMPENSATION BASED THEREON

(75) Inventors: R. Michael Buehrer, Morristown, NJ (US); Shang-Chieh Liu, Dover, NJ (US); Steven P. Nicoloso, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/296,409

(22) Filed: Apr. 23, 1999

(51) Int. Cl.[7] ............................................... H04L 27/06
(52) U.S. Cl. ...................................................... 375/340
(58) Field of Search ................................. 375/316, 346, 375/340, 232, 285

(56) References Cited

U.S. PATENT DOCUMENTS

| | | | | |
|---|---|---|---|---|
| 5,581,580 A | | 12/1996 | Lindbom et al. ............ | 375/340 |
| 5,771,461 A | * | 6/1998 | Love et al. ................. | 455/422 |
| 5,901,185 A | * | 5/1999 | Hassan ........................ | 370/522 |
| 5,903,610 A | * | 5/1999 | Skold et al. ................ | 375/262 |
| 6,157,847 A | * | 12/2000 | Buehrer et al. ........... | 455/278.1 |
| 6,243,444 B1 | * | 6/2001 | O'Neal ................... | 379/213.01 |
| 6,314,131 B1 | * | 11/2001 | Roe et al. .................. | 370/342 |
| 6,331,975 B1 | * | 12/2001 | Hosur et al. ................ | 370/209 |

FOREIGN PATENT DOCUMENTS

| | | | |
|---|---|---|---|
| EP | 1 047 232 A2 | * | 4/2000 |
| EP | 1 047 233 A2 | * | 4/2000 |
| WO | 97/39557 | | 10/1997 |

OTHER PUBLICATIONS

Parallel–type Coherent Multi–stage Interference Canceller with iterative Channel Estimation Using Both Pilot and decision feedback Data symbols for W–CDMA Modile Radio, IEEE, 2000, pp 709–714.*

Emre Aktas et al., "Semi–blind Channel Estimation for WCDMA Systems with Parallel Data and Pilot Signals," IEEE, 2001, pp 1282–1286.*

Schramm, Peter. "Analysis and Optimization of Pilot–Channel–Assisted BPSK for DS–CDMA Systems." *IEEE Transactions on Communications*. vol. 46, No. 9, Sep. 1998. pp. 1122–1124.

Schramm, Peter. "Pilot Symbol Assisted BPSK on Rayleigh Fading Channels with Diversity: Performance Analysis and Parameter Optimization." *IEEE Transactions on Communications*. vol. 46, No. 12, Dec. 1998.

A. Schiffer; European Search Report; Munich; 5 pages; Dec. 5, 2001.

Alfred Baier; "Correlative and Iterative Channel Estimation in Adaptive Viterbi Equalizers for TDMA Mobile Radio Systems"; Philips Communications AG, Nürnburg; pp. 363–368; © 1989.

Fuyun ling; "Pilot Assisted Coherent DS–CDMA Reverse–Link Communications with Optimal Robust Channel Estimation"; Motorola Inc., Cellular Infrastructure Group; pp. 263–266; © Apr. 21, 1997.

Magnus Sandell. Carlo Luschi, Paul Strauch, and Ran Yan; "Iterative Channel Estimation Using Soft Decision Feedback"; Bell Labs. Lucent Technologies; pp. 1–6; © Nov. 8, 1998.

Kuor–Hsin Chang and Costas N. Georghiades; "Iterative Joint Sequence and Channel Estimation for Fast Time–Varying Intersymbol Interface Channels"; Department of Electrical Engineering; pp. 357–361; © Jun. 18, 1995.

* cited by examiner

Primary Examiner—Tesfaldet Bocure

(57) ABSTRACT

The method of channel estimation generates an initial channel estimate from a pilot signal in a received signal, and estimates the data in the received signal using the channel estimate. An updated channel estimate is then obtained from the estimated data. This process of estimating the data and re-estimating the channel estimate is reiterated a desired number of times to refine the accuracy of the channel estimate.

7 Claims, 3 Drawing Sheets

ITERATIVE CHANNEL ESTIMATION AND COMPENSATION BASED THEREON

BACKGROUND OF THE INVENTION

1. Field of the Invention

The present invention relates to the field of wireless communication, and more particularly, a method of channel estimation and compensation based thereon.

2. Description of Related Art

In recent decades, many new technologies, such as multi-carrier transmission and smart antenna algorithms, have been proposed to increase the capacity of multi-user wireless communication systems. However, the performance improvement promised by such new technologies is usually limited by the accuracy of channel estimation. Channel estimation is the estimate of the distortion between the transmitter and the receiver of a signal introduced by the physical channel or medium through which the signal was transmitted. Using an estimate of this distortion (i.e., channel estimate), the receiver can remove some of this distortion and improve the accuracy of the received signal. Even a small improvement in channel estimation may introduce significant benefit to, for example, multi-user technologies.

Because of the movement of a mobile station in a wireless communication system, the physical channel is constantly changing. If coherent detection of the distortion in the physical channel is desired, then the phase of the distortion must be tracked. Because of the difficulty in tracking the phase of the distortion, the current code-division multiple access CMDA standard in the United States, IS-95, uses non-coherent detection on the system uplink (communication to the base station). Non-coherent detection is estimating data symbols in the received signal without accounting for distortion in the physical channel.

However, non-coherent detection suffers from poor performance with respect to the signal-to-noise ratio SNR, and SNR performance is directly related to the capacity of CDMA systems. Thus, the next generation CDMA standard, CDMA2000, has proposed coherent detection on the system uplink. To accomplish coherent detection, a pilot signal has been proposed for use in the system uplink. Accordingly, using the pilot signal, a simple form of coherent detection, called pilot assisted detection, can be performed.

Let the general received signal at the base station from a given mobile station be represented as:

$$r(t)=\alpha(t)[p(t)+j\cdot s(t)]+n(t) \quad (1)$$

where $\alpha(t)$ is the time-varying complex channel distortion assumed to be a complex Gaussian random process (GRP), s(t) is the data signal of interest, p(t) is the unmodulated pilot signal and n(t) is the noise plus interference which is assumed to be a GRP. Further, let p(t) and s(t) be defined such that they are orthogonal over some predetermined interval, $T_j$, i.e., $$\int_0^{T_i} p(t)s(t)\,dt = 0 \quad (2)$$

and $$\int_0^{T_i} |p(t)|^2 \, dt = \varepsilon_p \quad (3)$$

where $\varepsilon_p$ is the normalized pilot energy over $T_i$.

Assuming that the channel is constant over the interval [0, $T_p$], i.e., $\alpha(t)=\alpha$, $$\hat{\alpha} = \frac{1}{\varepsilon_p} \int_0^{T_p} r(t)p^*(t)\,dt \quad (4)$$
$$= \alpha + N$$

where * signifies the complex conjugate, $\hat{\alpha}$ is the initial estimate of $\alpha$ and $$N = \int_0^{T_i} p^*(t)n(t)\,dt$$

is a complex Gaussian noise term.

Having obtained the channel estimate, an estimate $\hat{s}(t)$ of the data signal s(t) is then obtained. The data signal is defined as:

$$s(t) = \sum_{i=-\infty}^{\infty} d[i]m_T(t - iT_s) \quad (5)$$

where d[i] is the data symbol during the ith symbol interval and $m_T(t)$ is the pulse waveform defined on [0, $T_s$], where $T_s$ is the time duration of one symbol, such that equation (2) is satisfied. The data symbols are estimated as:

$$\hat{d}[i] = f\left(\Im\left\{\int_{(i-1)T_s}^{iT_s} r(t)m_T^*(t)\hat{\alpha}^* \, dt\right\}\right) \quad (6)$$

where $f$ represents a decision function based on the modulation scheme, for example $f(x)=\text{sgn}(x)$ in bi-phase shift keying (BPSK), and $\tau(x)$ is the imaginary part of x. The estimates in equation (6) are the detected data in the pilot-assisted detection scheme.

As discussed previously, in view of the significant benefit obtained from even small improvements in the channel estimation, a demand exists for improvements on the pilot assisted detection methodology.

SUMMARY OF THE INVENTION

The method of channel estimation according to the present invention makes an initial channel estimate using a pilot signal in the received signal and generates an estimate of the data in the received signal. Another channel estimate, is then obtained from the estimated data. This process of estimating the data and re-estimating the channel estimate is reiterated a desired number of times to refine the accuracy of the channel estimate.

Additionally, in a further embodiment of the present invention, after generating a channel estimate from the estimated data, an adaptive channel estimate is obtained. The adaptive channel estimate is generated based on the two most recently generated channel estimates. The degree of adaptation may be determined to further improve the accuracy of the channel estimate and reduce signal-to-noise ratio in the wireless communication system to which the method according to the present invention is applied.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
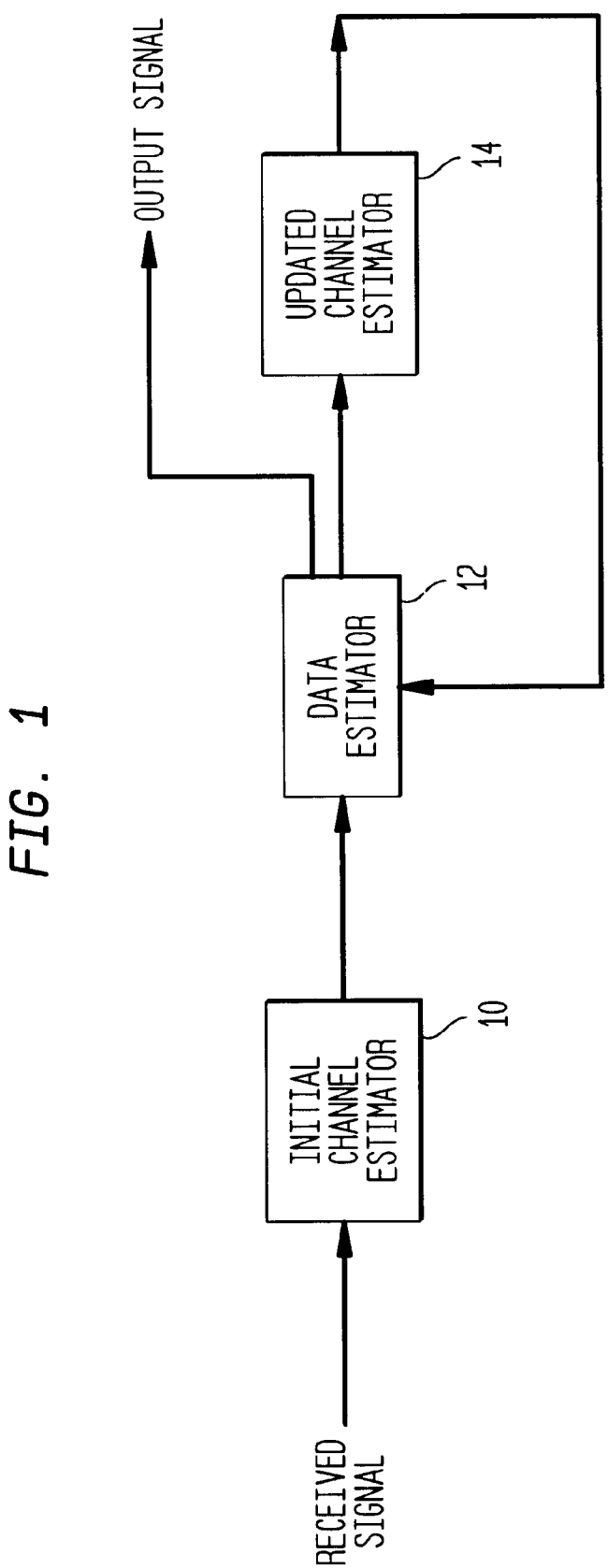
FIG. 1 illustrates the device for generating a channel estimate and performing channel estimate compensation according to the present invention.

FIG. 1 illustrates the device for generating a channel estimate and performing channel estimate compensation according to the present invention. As shown, an initial channel estimator 10 receives a signal, which includes at least a pilot signal and a data signal satisfying equation (2). The initial channel estimator 10 generates and supplies output to a data estimator 12. The data estimator 12 supplies output to an updated channel estimator 14 and receives output from the updated channel estimator 14. The data estimator 12 also supplies an output signal.

Figure 2:
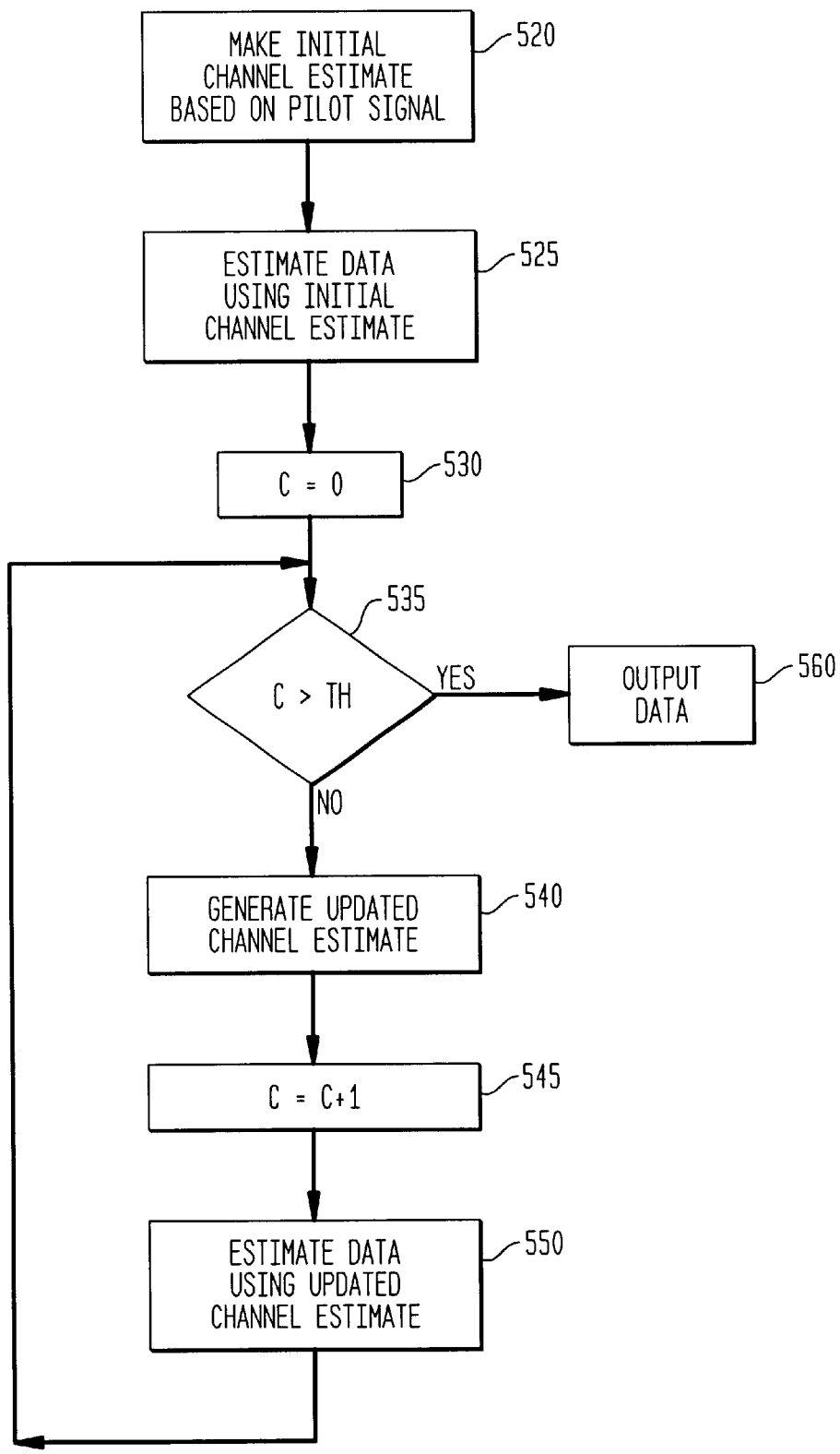
FIG. 2 illustrates a flow chart of a first embodiment of the method of channel estimation and compensation based thereon according to the present invention.

The operation of the device illustrated in FIG. 1 will be described with respect to FIG. 2. FIG. 2 illustrates a flow chart of the method of channel estimation and compensation based thereon according to the present invention. As shown, in step S20 the initial channel estimator 10 initially estimates the distortion in the physical channel using the pilot signal in the received signal. The initial channel estimator 10 generates the channel estimate using any well-known channel estimation method, which uses a pilot signal, such as the pilot assisted detection methodology previously described. Preferably, but not essentially, the initial channel estimate is generated according to the block updated linear regression methodology disclosed in application no. unknown filed concurrently herewith, entitled "A METHOD OF CHANNEL ESTIMATION AND COMPENSATION BASED THEREON" by the inventors of the subjection application, hereby incorporated by reference in its entirety. It is noted that in some standards the pilot signal may include power control bits. Preferably, but not essentially, these bits are ignored in determining the initial channel estimate.

Next, using the initial channel estimate, the data estimator 12 estimates the data according to equations (5) and (6) in step S25. For the estimated data, the data estimator 12 sets a count value C to zero.

After determining that the count value C for the estimated data is less than some predetermined threshold (a design parameter set according to the designer's preferences) in step S35, the data estimator 12 sends the estimated data and associated count value C to an updated channel estimator 14. The updated channel estimator 14, in step S40, generates an updated channel estimate based on the estimated data received from the data estimator 12 using any well-known channel estimation method. Preferably, but not essentially, the above-cited block update linear regression methodology is used. Alternatively, the updated channel estimate is generated according to equation (7) below:

$$\hat{\alpha}' = -j \cdot \frac{1}{k_{da}\varepsilon_s} \int_0^{k_{da}T_s} r(t)\hat{s}^*(t)dt \tag{7}$$

where $\hat{\alpha}'$ is the updated channel estimate, $k_{da}$ is the number of data symbols over which the estimate is formed, and $\varepsilon_s$ is the energy per symbol.

The updated channel estimator 14 then increments the count value C associated with the estimated data in step S45, and sends the updated channel estimate and count value C to the data estimator 12. In step S50, the data estimator 12 re-estimates the estimated data using the updated channel estimate.

The process of steps S35–S50 repeats until the data estimator 12 determines that the count value C for the estimated data exceeds the predetermined threshold. When the predetermined threshold is exceeded, the data estimator 12 outputs the estimated data as the output signal.

Figure 3:
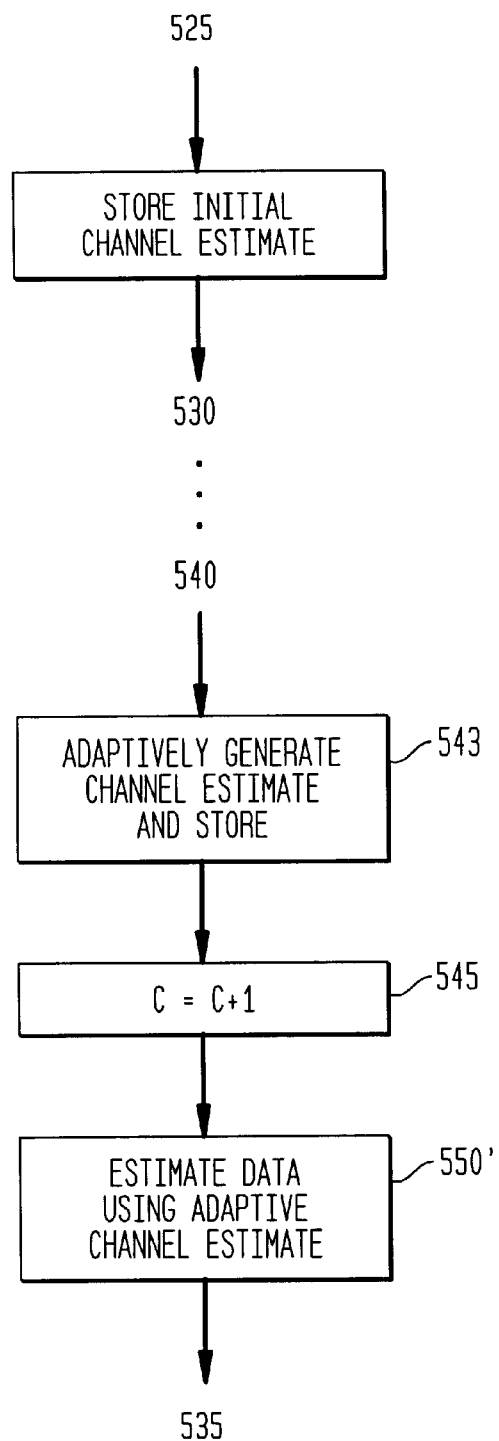
FIG. 3 illustrates the flow chart of a second embodiment of the method of channel estimation according to the present invention.

FIG. 3 illustrates the flow chart of a second embodiment of the method of channel estimation according to the present invention. More specifically, FIG. 3 shows modifications to the flow chart of FIG. 2 to arrive at the second embodiment. Accordingly, only these modifications will be discussed in detail for the sake of brevity.

As shown, after step S25, the initial channel estimator 10 stores, in step S27, the initial channel estimate in a memory (not shown) accessible to the updated channel estimator 14. The method then continues with step S30 as described above.

Then, after step S40, the updated channel estimator 14 generates, in step S43, an adaptive channel estimate using the updated channel estimate generated in step S40 and the stored channel estimate, and stores the adaptive channel estimate in the memory (not shown). When the count value is zero, the stored channel estimate is the initial channel estimate. However, when the count value is greater than zero, the stored channel estimate will be the previously generated adaptive channel estimate. The updated channel estimator 14 generates the adaptive channel estimate according to equation (8) below:

$$\hat{\alpha}[i] = \delta\hat{\alpha}[i-1] + (1-\delta)\hat{\alpha}' \tag{8}$$

where $\hat{\alpha}[i]$ is the adaptive channel estimate, $\hat{\alpha}[i-1]$ is the stored channel estimate, $\hat{\alpha}'$ is the updated channel estimate determined in step S40, and $\delta$ is a factor indicating the degree to which the adaptive channel estimate is adaptive. It will be readily appreciated that if $\delta$ is selected as zero, the second method illustrated in FIG. 3 becomes the same as the first method discussed with respect to FIG. 2. The factor $\delta$ is a design parameter, which is set based on the designer's preference.

One approach to setting $\delta$ is to use a value of $\delta$ which reflects the SNR of the two signals used for estimation, i.e., $$\delta = \frac{\gamma_p}{\gamma_p + \gamma_s} \tag{7}$$

where $\gamma_p$ is the SNR of the pilot signal and $\gamma_s$ is the SNR of the data. More specifically, $$\gamma_p = \frac{P_p}{\sigma^2/T_p} \tag{8}$$

and $$\gamma_s = \frac{P_s}{\sigma^2/T_s} \tag{9}$$

where $P_p$ is the power transmitted in the pilot signal, $P_s$ is the power transmitted in the data signal, and $\sigma^2$ is the noise variance.

This leads to $$\delta = \frac{\beta k}{1+\beta k} \quad (10)$$

where $$\beta = \frac{P_p}{P_s}$$

is the pilot fraction and $$k = \frac{T_p}{T_s}$$

is the ratio of the pilot filter bandwidth to the data bandwidth.

A second approach is to use the SNRs of the actual channel estimates. That is $$\delta = \frac{\gamma'(i-1)}{\gamma'(i-1) + \gamma'_{(i)}} \quad (11)$$

$$\gamma'(i) = \frac{E\{\alpha[i]\}^2}{\mathrm{var}\{\alpha[i]\}} \quad (12)$$

where E{} is the expected value. However, preferably, but not necessarily, γ(i) and γ(i-1) are empirically determined.

After the adaptive channel estimate is determined in step S43, the count value C is increased by one in step S45. Then the adaptive channel estimate and the count value C are sent to the data estimator 12. In step S50', the data estimator 12 operates in the same manner as discussed above with respect to step S50 of FIG. 2, except that the adaptive channel estimate is used to estimate the data instead of the updated channel estimate.

The iterative method of channel estimation further refines the accuracy of an initial channel estimate, and offers an improvement over known channel estimation techniques. Accordingly, the method of the present invention provides significant benefit to, for example, multi-user technologies.

It should be understood that the method according to the present invention can be implemented by a properly programmed digital signal processor or ASIC having sufficient memory capacity, and that the digital signal processor or ASIC is resident in the receiver of the transmitted signal. Accordingly, the method according to the present invention may be used by mobile stations of wireless communication systems employing downlink pilot signals and by base stations of wireless communication systems employing uplink pilot signals.

We claim:

1. A method for iterative channel estimation, comprising:
   a) generating an initial channel estimate using a pilot signal in a received signal;
   b) generating an estimate of a data signal associated with said pilot signal using said initial channel estimate;
   c) generating a new channel estimate based on said estimated data signal; and
   d) adaptively generating a channel estimate based on said initial channel estimate and said new channel estimate generated in step c).

2. The method of claim 1, further comprising:
   f) generating an estimate of said data signal based on a current adaptively generated channel estimate;
   g) generating a channel estimate based on said data signal estimated in step f);
   h) adaptively generating a channel estimate based on said channel estimate generated in step g) and said current adaptively generated channel estimate as said current adaptively generated channel estimate.

3. The method of claim 2, further comprising:
   i) repeating step f), g) and h) a predetermined number of times.

4. The method of claim 2, wherein said step f) comprises:
   f1) determining linear regression coefficients for N blocks of samples in said pilot signal; and
   f2) obtaining a channel estimate based on said linear regression coefficients for said N blocks.

5. The method of claim 1, wherein said step (d) adaptively generates said channel estimate based on signal-to-noise ratios of said pilot signal and said data signal.

6. The method according to claim 1, further comprising:
   e) defining a degree to which the adaptive channel estimate is adaptive.

7. A method for iterative channel estimation, comprising:
   a) generating an initial channel estimate using a pilot signal in a received signal;
   b) generating an estimate of a data signal associated with said pilot signal using said initial channel estimate;
   c) generating a new channel estimate based on said estimated data signal;
   d) incrementing a count value after the generation of each new channel estimate; and
   e) outputting the estimated data as an output signal when the count value exceeds a predetermined threshold.

* * * * *